US008667560B2

(12) United States Patent
Albisu (10) Patent No.: US 8,667,560 B2
(45) Date of Patent: Mar. 4, 2014

(54) AUTHENTICATING A USER WITH PICTURE MESSAGING (75) Inventor: Luis F. Albisu, Fairfax Station, VA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 364 days.

(21) Appl. No.: 12/872,784

(22) Filed: Aug. 31, 2010

(65) Prior Publication Data
US 2012/0054833 A1  Mar. 1, 2012

(51) Int. Cl.
*G06F 7/04* (2006.01)

(52) U.S. Cl.
USPC ............... 726/2; 726/3; 726/4; 726/6; 726/7; 726/17; 726/18; 726/19; 726/21; 713/182; 713/183; 713/184; 713/185; 715/764; 705/14.49; 705/14.4; 705/14.73; 705/26.1; 705/27.1

(58) Field of Classification Search
USPC ............................................................. 726/4
See application file for complete search history.

(56) References Cited

U.S. PATENT DOCUMENTS

| 7,886,155 | B2 | 2/2011 | Fiske | |
|---|---|---|---|---|
| 7,895,445 | B1 | 2/2011 | Albanese | |
| 7,900,265 | B1 | 3/2011 | Plotkin | |
| 7,920,851 | B2 | 4/2011 | Moshir | |
| 2007/0277224 | A1* | 11/2007 | Osborn et al. | 726/2 |
| 2008/0179390 | A1 | 7/2008 | Harjani | |
| 2009/0077653 | A1* | 3/2009 | Osborn et al. | 726/17 |
| 2011/0071922 | A1 | 3/2011 | Hirson | |
| 2011/0078762 | A1 | 3/2011 | Bijlsma | |
| 2011/0145899 | A1* | 6/2011 | Cao et al. | 726/7 |
| 2011/0184804 | A1* | 7/2011 | Sontag et al. | 705/14.49 |

* cited by examiner

*Primary Examiner* — Nathan Flynn
*Assistant Examiner* — Bryan Wright
(74) *Attorney, Agent, or Firm* — Hartman & Citrin LLC (57) ABSTRACT

Systems and methods for authenticating a user of a service are disclosed. A host of a service provides a user interface that can be accessed via a display of a terminal. Upon successfully transmitting a first set of credentials, the host requests a random image to be generated by an authentication server. The authentication server transmits the random image to the host, as well as to a mobile device that is associated with the user of the service. The mobile device receives a picture message including the image. The user interface displays a list of images on the display. The user matches the received image with an image among the list of images, wherein a successful match follows in the user being granted access to the service. Consequently, an additional layer of security using a visual identification of a user is provided.

20 Claims, 10 Drawing Sheets

AUTHENTICATING A USER WITH PICTURE MESSAGING

BACKGROUND OF THE INVENTION

1. Field of the Invention

The present invention relates to authenticating users. In particular, the present invention relates to authenticating a user of a service by sending a picture message to a mobile device.

2. Background of the Invention

As more people access more information online or across networks, there is a greater chance that sensitive information can come into the wrong hands. Increasingly, banks, insurance companies, and other service providers are enabling people to access services online, such as account downloads, payments, etc. The service is typically accessed via a web-site hosted on a web server or a host server. Further, other types of access systems are being provided with network connectivity. For instance, security systems, building access systems, etc., have network interfaces to connect to a remote server across the internet, to provide status reports, raise alarms, etc. These security systems have control panels that enable users to change the settings, or allow access to a secure resource.

Security is an increasing concern as the internetworking capabilities of these systems converge. Without proper layers of authentication, unauthorized users can gain access to sensitive information stored online, or to secure services to which they should not have access. Although a name and password are typically used to authenticate users, this system relies on only a single layer of authentication and can be bypassed or "hacked" by a remote user having the right set of tools.

Present-day solutions to overcome these security concerns are limited in their efficacy and ease of use. Some secure web-sites use RSA cryptography, such as implementing an RSA secure ID token for authenticating a user. IP addresses of terminals and computers can be recorded and stored so as to properly identify a user. However, these methods do not ensure that the appropriate user is accessing the service, as this information is typically static and can be "forged" by experienced crackers. Moreover, adding higher-level layers of security such as biometric identifiers, etc. is expensive as it requires implementing additional scanners and processing units to a network and to the users of these services.

What is therefore needed is the ability to authenticate a user of a service that makes optimal use of existing system infrastructure and that is easy for a user to use.

SUMMARY OF THE INVENTION

The present invention solves the above problems by authenticating a user of a service, such as a web-based service using image-matching. A user compares an image received on the user's mobile device with a set of images displayed on an interface provided by the customer. The interface has an input for the user to select an image. If the user selects an image from the list displayed on the interface that is the same as the image received on the mobile device, then the user is properly authenticated to access the service. The service provider operates the web portal or other system that has the interface accessible by the user. The list of images along with the user's information is provisioned on an authentication server that is operated by a network operator. The service provider is a customer of the network operator.

In one exemplary embodiment, the present invention is a method for authenticating a user of a service offered by a host. The method includes receiving from a host server an authentication request, the authentication request including at least a customer ID for the host and a user ID for the user, determining that the user ID exists in a user database stored in a customer account associated with the host, randomly selecting an image from a plurality of images associated with the customer account, informing the host server about the randomly selected image, generating a picture message, the picture message including at least the randomly selected image, and transmitting the picture message to a mobile device associated with the user. The user receives the picture message, and authenticates themselves to the host server by matching the randomly selected image with one of a plurality of images displayed by the host to the user.

In another exemplary embodiment, the present invention is a method for authenticating a user of a service offered by a service provider. The method includes successfully receiving a first credential from the user via a user interface offered by the service provider, transmitting an authentication request to an authentication server, receiving information about a randomly selected image from the authentication server, displaying a plurality of images on the user interface, the plurality of images including the randomly selected image, receiving a selection of an image from the user, determining that the user-selected image matches the randomly selected image, and granting access to the service. The authentication server transmits a copy of the randomly selected image to a mobile device owned by the user via a picture message. The method further includes providing the authentication server with a plurality of user IDs and a corresponding plurality of addresses of mobile devices of the users of the service, as well as selecting the plurality of images to be displayed on the user interface.

In yet another exemplary embodiment, the present invention is a system for authenticating a user of a service offered by a customer. The system includes a customer server on a first network, the customer server having logic for providing a user interface to a user, receiving a first credential from a user via the user interface, and transmitting an authentication request across the network, the authentication request including at least a customer ID and a user ID. An authentication server on a second network in communication with the first network has logic fo receiving the authentication request, determining that the user ID exists in a user database stored in a customer account associated with said customer ID, randomly selecting an image from a plurality of images associated with the customer account, informing the customer server about the randomly selected image, generating a picture message including at least the randomly selected image, and transmitting the picture message to a network address for the user. A mobile device receives the picture message across the second network, while being in possession of the user of the service. The customer server further has logic for displaying a plurality of images on the user interface, the plurality of images including the randomly selected image, receiving a selection of an image from the user, determining that the user-selected image matches the randomly selected image transmitted to the mobile device, and granting access to the service. A terminal provides a user with access to the user interface, the terminal including at least a display and an input. The terminal may be a computer that can access the user interface via the first network, or a logic unit on the mobile device such as a web-browsing application.

DETAILED DESCRIPTION OF THE INVENTION

The present invention presents a novel technique for authenticating a user of a service. The service is offered by a service provider. The user accesses the service via an interface on a computer or any device having a display. The interface may be hosted on a web server on a network. The user further has a mobile device that has a unique address such as a telephone number. Upon successfully completing a first authentication mechanism, such as typing in a username and a password, an authentication server transmits a picture message to the mobile device. The picture message includes at least an image, and optionally alternate text. The interface of the service provider further displays a list of images on the display. One image from the list of images matches the image received by the user's mobile device. The user matches the received image with the correct image among the list of images, and is granted access to the service.

As used herein and throughout this disclosure, the term "mobile device" refers to any electronic device capable of wirelessly sending and receiving data. A mobile device may have a processor, a memory, a transceiver, a display, an input, and an output. Examples of such devices include cellular telephones, personal digital assistants (PDAs), portable computers, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories).

"Logic", as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a telecommunication network, logic may be programmed on a server, or a complex of servers. A particular logic unit is not limited to a single logical location on the telecommunication network.

Mobile devices communicate with each other and with other elements via a network, for instance, a wireless network, or a wireline network. A "network" can include broadband wide-area networks such as cellular networks, local-area networks (LAN), wireless LAN (Wi-Fi), near-field communication (NFC) networks, etc. Communication across a network is preferably packet-based; however, radio and frequency/amplitude modulations networks can enable communication between communication devices using appropriate analog-digital-analog converters and other elements. Communication is enabled by hardware elements called "transceivers." Mobile devices may have more than one transceiver, capable of communicating over different networks. For example, a cellular telephone can include a cellular transceiver for communicating with a cellular base station, a Wi-Fi transceiver for communicating with a Wi-Fi network, and a BLUETOOTH® transceiver for communicating with a BLUETOOTH® device.

A network typically includes a plurality of elements that host logic for performing tasks on the network. The logic can be hosted on servers. In modern packet-based wide-area networks, servers may be placed at several logical points on the network. Servers may further be in communication with databases and can enable communication devices to access the contents of a database. Authentication servers, application servers, etc. are examples of such servers. A server can include several network elements, including other servers, and can be logically situated anywhere on a service provider's network, such as the back-end or "core network" portion of a cellular network.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern. The only exception is method steps (S101, S301, etc.) that need not be correspondingly labeled.

Figure 1:
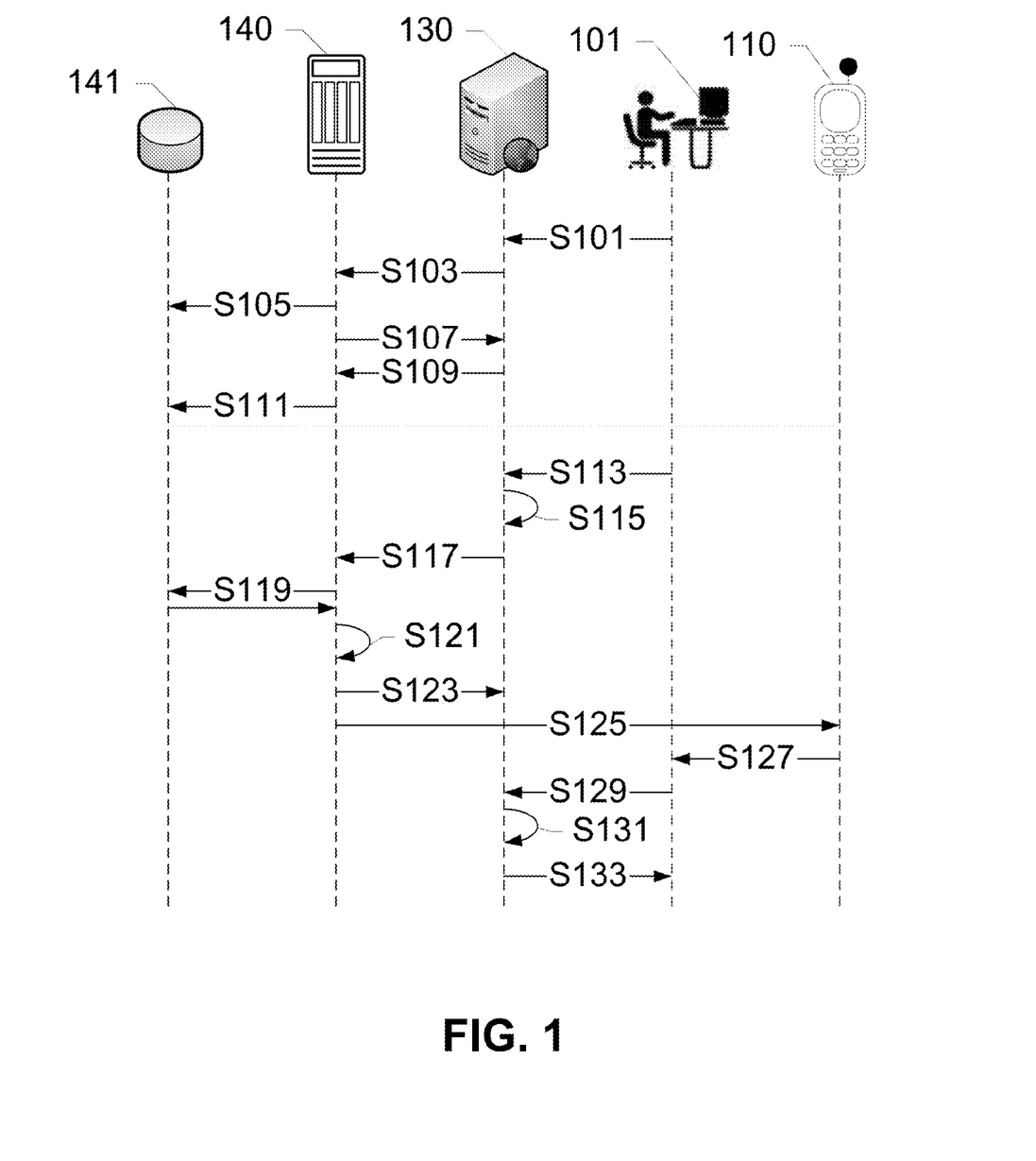
FIG. 1 shows a network flow diagram, according to an exemplary embodiment of the present invention.

FIG. 1 shows a network flow diagram, according to an exemplary embodiment of the present invention. A user on a terminal 101 is able to access web server 130, or "host server" over a network such as the Internet. The user further owns a mobile device 110. Host server 130 communicates with authentication server 140 over one or more networks. Authentication server 140 is owned and operated by the same network operator that provides network coverage to mobile device 110. Authentication server 140 is in communication with database 141. According to the present invention, a service provider or "host" contracts with a network operator to provide authentication services to the host. The host in turn provides an unrelated service to the user. Consequently, it is understood that host server 130 is owned by a "customer" of the network operator in control of authentication server 140.

According to this exemplary embodiment, user via terminal 101 accesses a service hosted on host server 130. The service can be an online service, such as accessing the user's bank account information online, or logging into any user account. If terminal 101 is accessing host server 130 for the first time, as in S101, host server 130 creates an account for the user. The account is created locally, and additionally provisioned S103 to authentication server. In other words, host server 130 contains logic to access database 141 via authentication server 140, and request that the first time user 101 be added S105 to a user database within database 141. Further, if it is assumed that host server 130 is a first-time user of authentication server 140, then further provisioning steps S107-S111 involve provisioning the type of image-matching service and other preferences that can be adjusted by host 130. In other words, host 130 provides their preferences S109 to authentication server 140, which then stores S111 the preferences in a customer account for host 130.

The dotted line between S111 and S113 separates the provisioning process from the usage described in S113-S133. User at terminal 101 now accesses S113 the service on host 130, and provides a first credential to identify the user. For instance, the user can submit a name and a password, or enter a PIN code. Host 130 processes the incoming request S115, and determines that the user is legitimate, i.e. that the first credential was valid. Subsequently, host 130 requests S117 a random image from authentication server 140. The request also contains an identifier of user 101, for instance, the credential provided. Authentication server 140 refers S119 to database 141 to look for an appropriate image to be transmitted to the user. The random image is one of several that may be added to the customer account during the provisioning process. Database 141 returns a list of images, and a telephone number (or other equivalent address) for mobile device 110 owned by user of terminal 101. Authentication server 140 executes logic S121 that randomly selects an image, and generates a picture message including the image to be transmitted to mobile device 110. The authentication server transmits S123 information about the randomly selected image, or a copy of the image to host 130. Host 130 displays to terminal 101 a list of images, wherein one of the images in the list is the randomly selected image.

Authentication server 140 additionally forwards S125 the picture message to mobile device 110, traversing other standard network elements if necessary. The owner of mobile device 110 refers to the image while accessing terminal 101, and selects S127 the image when presented with the list of images at terminal 101. In S129, the user's selection is transmitted from terminal 101 to host 130. Host 130 executes logic S131 to determine if the user has selected the correct image. Upon a successful authentication, host 130 grants S133 the service to the user at terminal 101. The service may be any online service, such as access to a user account. The service may be a transaction confirmation screen for an online retailer. Alternatively, the service may be access to an API, a virtual private network (VPN) on a remote computer, a control panel for a security system, or other applications that rely on authentication.

Figure 2:
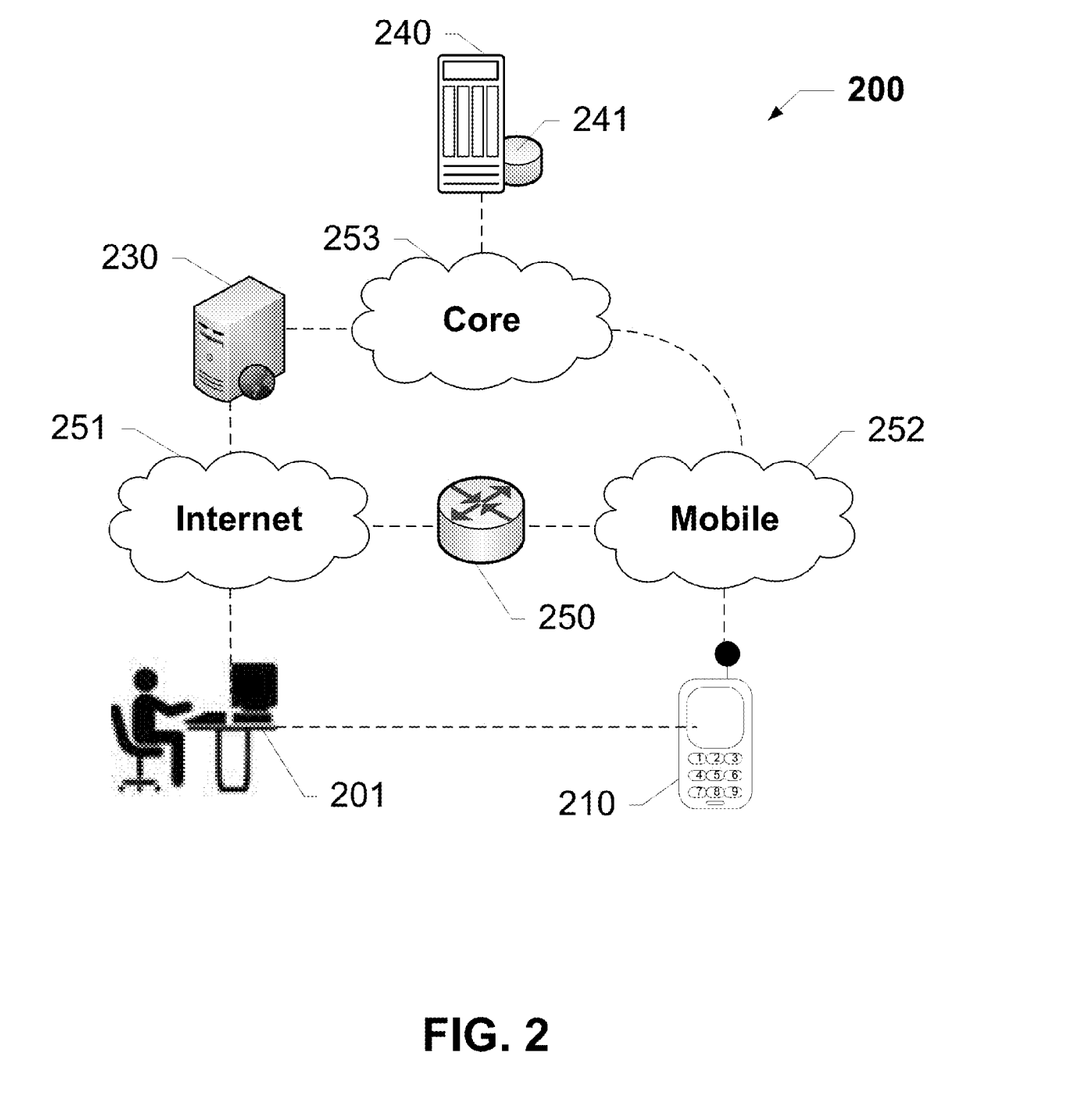
FIG. 2 shows the elements of a system for authenticating a user, according to an exemplary embodiment of the present invention.

FIG. 2 shows the elements of a system for authenticating a user, according to an exemplary embodiment of the present invention. System 200 includes a user at a terminal 201, and having in their possession a mobile device 210. Terminal 201 accesses host server 230 via a network such as the internet 251. For instance, an application on terminal 201, such as a web browser, uses the HTTP or HTTPS protocol to access a web site hosted by host 230. The web-site may be an APACHE module or similar front-end API. Other methods of accessing a service will become apparent to one of ordinary skill in the art upon reading this disclosure. Further, mobile device 210 communicates with a mobile network 252. Elements in mobile network 252 are not shown but include at least a radio network, a plurality of switches, and other servers. Mobile network 252 can also access Internet 251 via gateway 250. Further, a core network provides access to entities at the back-end of mobile network 252. Core network 253 may be an IP Multimedia System (IMS) Core, whereby access to authentication server 240 is governed by one or more edge routers, proxy servers, firewalls, etc.

Host 230 is configured to access authentication assistance from authentication server 240. To access user database 241, a host 230 would have to have appropriate credentials and/or authorization to authentication server 240, or to another entity in core network 253. User database 241 stores an account for host 230, the account including a user database of the users of host 230, as well as telephone numbers for devices associated with the users. In one exemplary embodiment, user database 241 is linked to an active directory or Lightweight Directory Access Protocol (LDAP) server containing domains or subdomains for a plurality of customers or hosts 230. Each customer transmits a list of existing user IDs to be provisioned into database 241. Further, the customer can select one or more of a plurality of categories, and an image from said categories, thus adding an extra layer of authentication for the user of terminal 201 to pass through.

As described above, authentication server 240 constructs picture messages, for instance multimedia service (MMS) messages, and instructs mobile network 252 to transmit a randomly selected image to mobile device 210.

Figure 3:
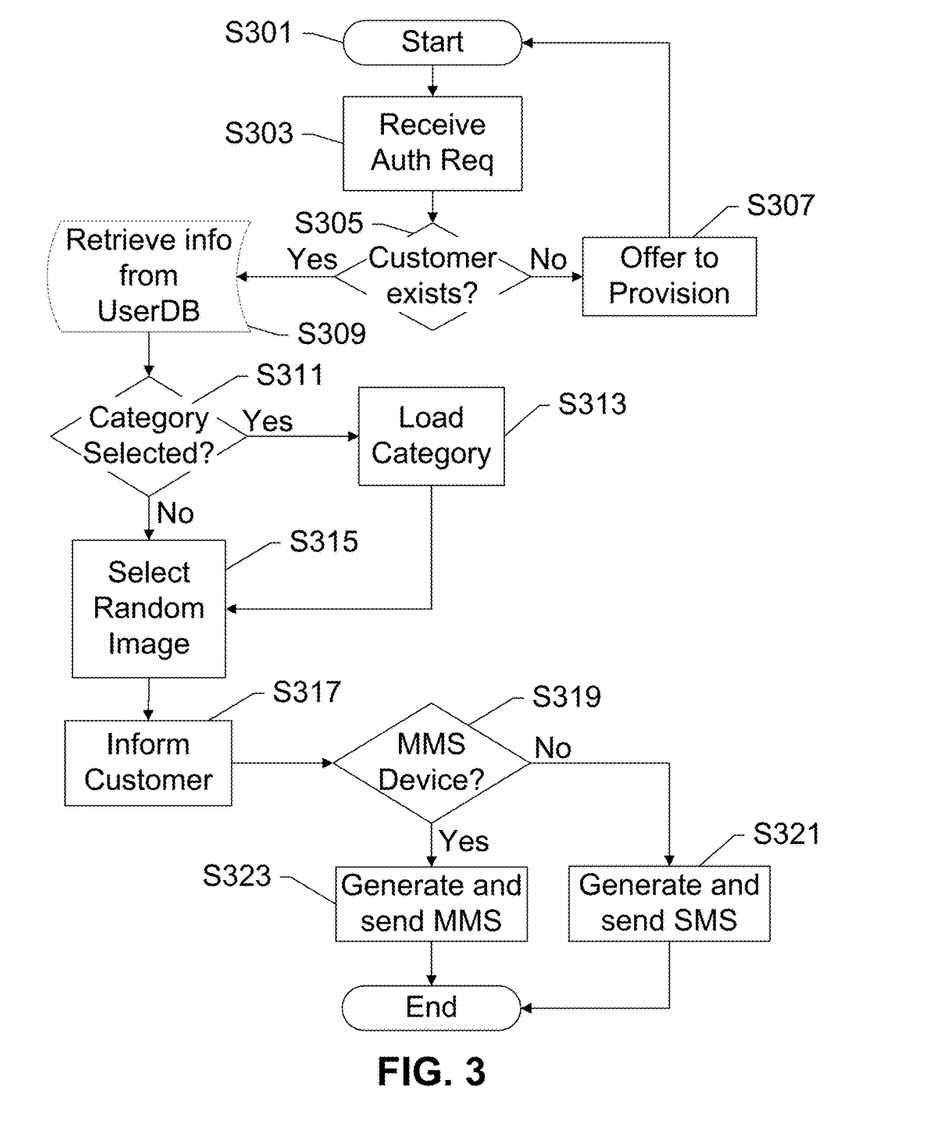
FIG. 3 shows a method for authenticating a user at an authentication server, according to an exemplary embodiment of the present invention.

FIG. 3 shows a method for authenticating a user at an authentication server, according to an exemplary embodiment of the present invention. The method begins with the authentication server receiving S303 an authentication request from a client, customer, or a host of a service that the user is trying to access. The authentication server refers S305 to a local or network database to determine an account exists with the host. If not, an offer to provision a new account S307 is forwarded to the host server and the method restarts S301. If, however, the customer is an existing client of the network operator, then the specified User ID for the user is used to retrieve S309 user information from the database. The user information includes at least a telephone number or equivalent address for a mobile device owned by the user, wherein the equivalent address is an IP, SIP, or other unique address.

The authentication server further selects a random image from a plurality of images provisioned/initially selected by the host. If a category is provisioned S311, then the category containing a plurality of related images is loaded S313. Whether or not a category is provisioned, authentication server selects S315 a random image and informs the customer/host about the image selected. The informing S317 may include a filename or other identifier of the image, or a copy of the image itself. It can be assumed that the host has stored locally a copy of the images and any categories that were provisioned in the database. Further, the authentication server also retrieves in S309 any device information for the user. For instance, a determination is made S319 that the user's device is incapable of receiving picture messages. In this case, the present invention provides for an alternate text method S321 to direct the user to select the correct image. The alternate text could be transmitted via SMS and could state directions such as "choose the second image from top," etc. If S319 determines that the mobile device is MMS capable, then an MMS message including the randomly selected image is generated and dispatched S323 to the telephone number/address of the user's mobile device. The user can then match the received image to a list of images displayed at a user interface or terminal, and thereby authenticating. A provisioning process allows the host customer to select how the flow works for customers with differing needs. Provisioning and maintenance is enabled via other supporting servers such as in the IMS core shown above.

Figure 4:
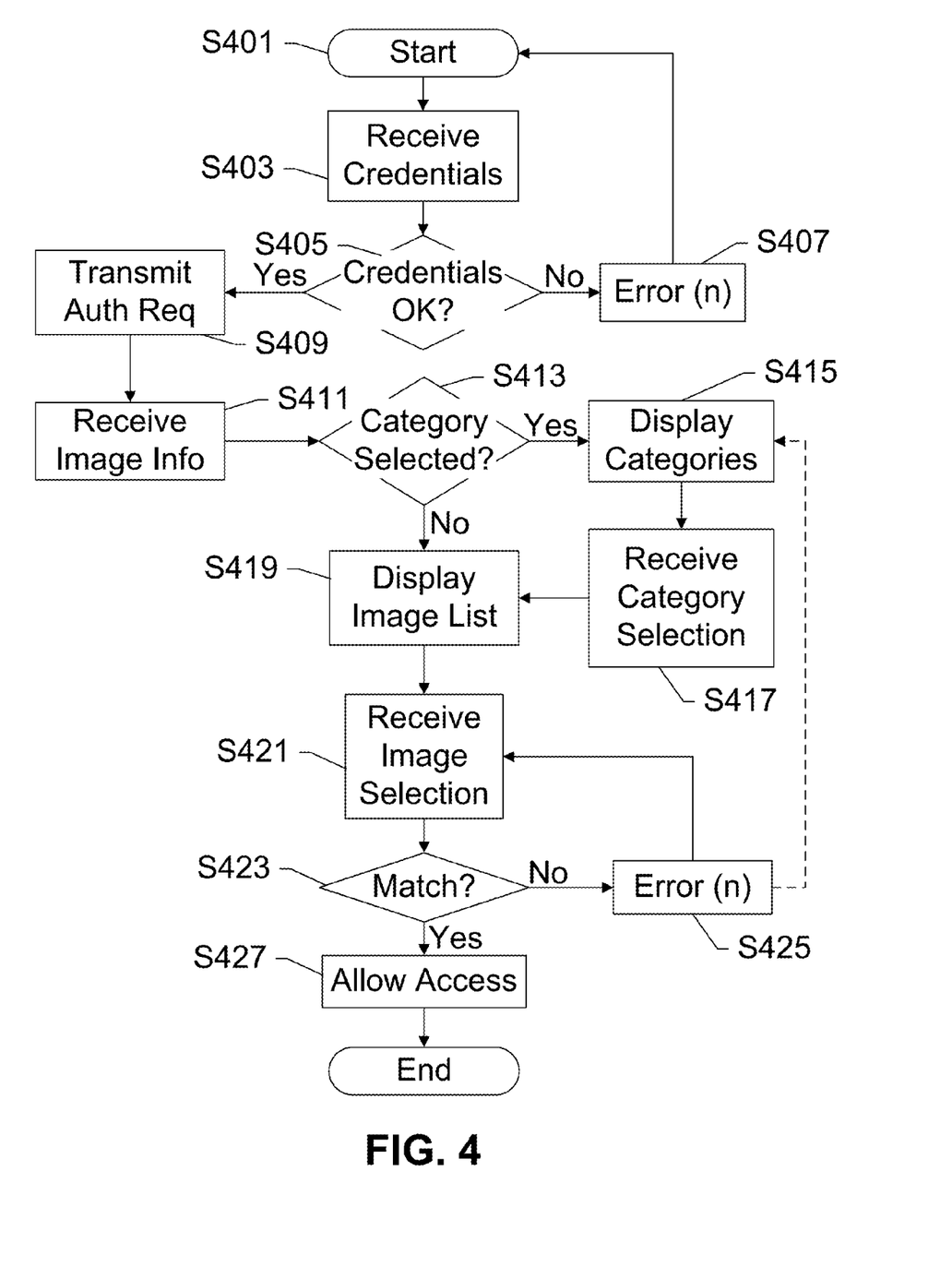
FIG. 4 shows a method for requesting a random image selection from an authentication server, according to an exemplary embodiment of the present invention.

FIG. 4 shows a method for requesting a random image selection from an authentication server, according to an exemplary embodiment of the present invention. The method is described from the point of view of a host, and begins when a user transmitting a first set of credentials via a terminal or interface provided by the host. The credentials, such as a name and password, are received S403, and a local database is referenced to determine S405 that the user has an account with the host. If the user credentials are invalid, or nonexistent, then an error is returned S407, and a first login screen is presented S401. The error may occur for n cycles, after which the user can be banned, an alarm raised, etc.

If the credentials are valid, then the second-layer authentication process of the present invention begins. An authentication request is transmitted S409 to an authentication server. The authentication request includes at least an identifier of the user (such as the first credential), as well as an identifier of the host itself. Assuming a successful authentication request, image information or a copy of the randomly selected image is received S411 from the authentication server. It is then determined S413 if the image falls within a particular category. If yes, then the categories are displayed S415 on the user interface on the terminal, and a user would have to select a category S417 in order to be presented with a list of images S419. If no category is selected, then the host simply displays a list of images S419. The randomly selected image is one of the images in the list. A user makes a selection on the user interface, and the selection is received S421 at the host. The host determines if the user-selected image matches the randomly-selected image of S411, and if this is the case, then the host grants the user permission to access a service S427. If the matching 423 proves to be incorrect, then an error is returned S425, and a list of categories or images is presented to the user again. The error S425 can occur up to a predefined n number of times before locking the system, banning the user, initiating a lock timer, or raising an alarm.

FIGS. 5, 6, 7, and 8 all show various screenshots of a user experience according to an exemplary embodiment of the present invention. Generally, it can be assumed that the flow follows the exemplary network flow of FIG. 1.

Figure 5:
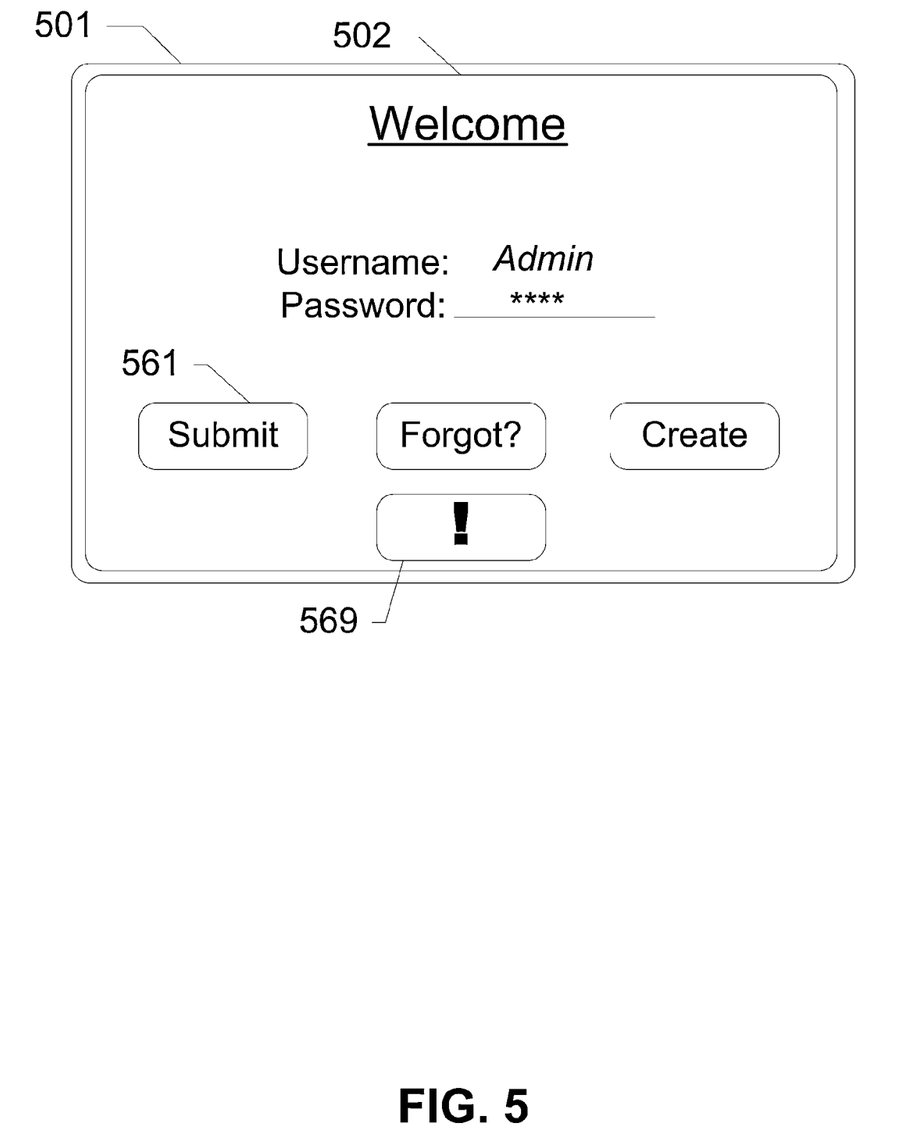
FIG. 5 shows a welcome screen on a user interface, according to an exemplary embodiment of the present invention.

FIG. 5 shows a welcome screen on a user interface, according to an exemplary embodiment of the present invention. User interface 501 has a screen 502 that doubles as an input and an output device. For instance, screen 502 is a touch-sensitive screen, enabling a user to select options such as Submit button 561 or emergency button 569. Screen 502 may also include a touch-screen keyboard for inputting a username and a password.

As described above, and as will become evident to one of ordinary skill in the art upon reading this disclosure, user interface 501 may be provided in a number of situations. For instance, interface 501 is a control panel for a security system that is restricting access to a secure resource. In such a case, the secure resource is the service that the user is attempting to access. In other examples, interface 501 may be accessible via any terminal such as a computer accessing the internet, or a remote terminal accessing a VPN. In either case a user inputs the first credentials and pushes the submit button 561. The user can always push the "forgot" button to initiate password retrieval measures, or "create" to create a new account to use the service.

Figure 6:
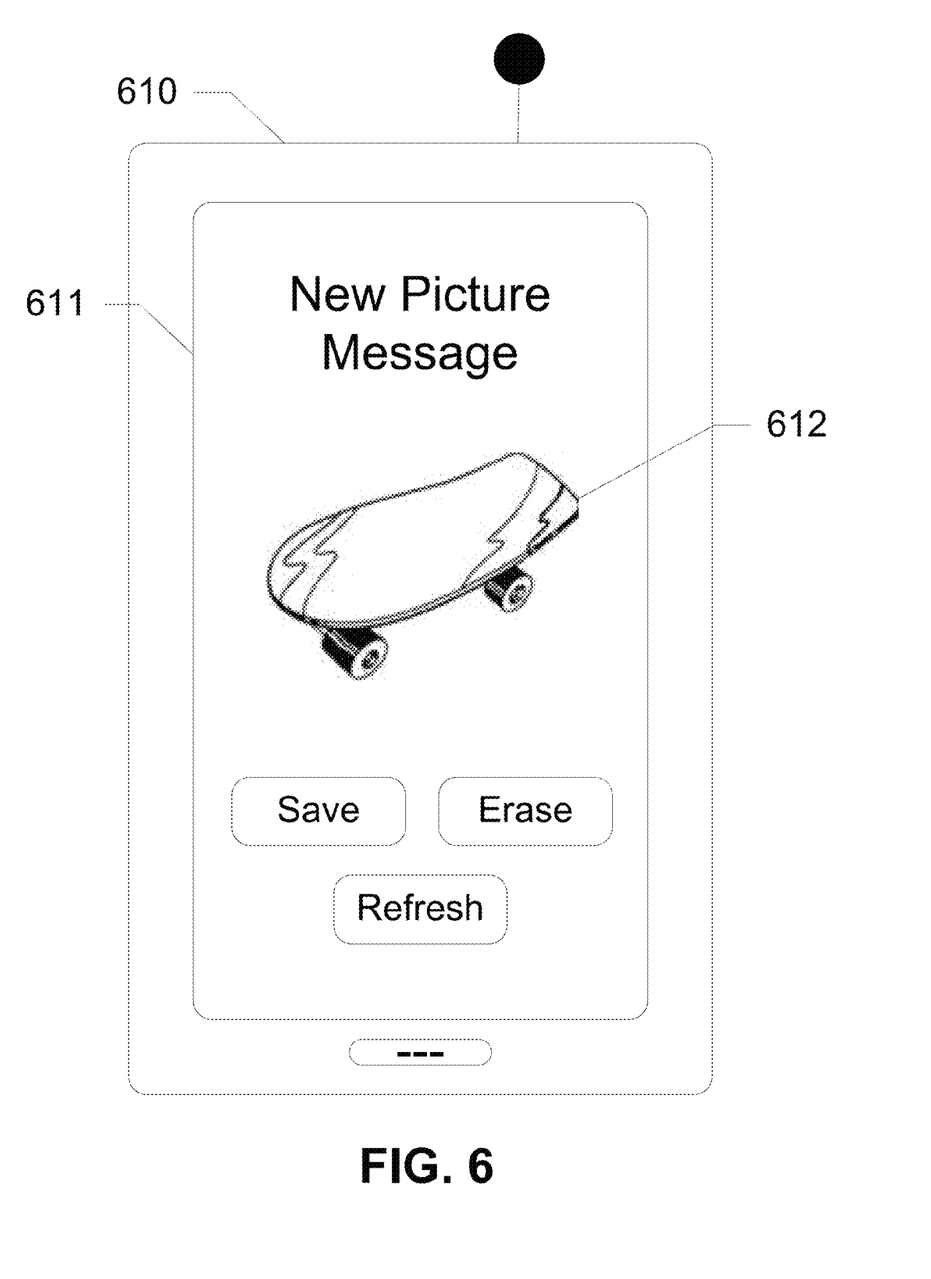
FIG. 6 shows an incoming picture message on a mobile device owned by a user, according to an exemplary embodiment of the present invention.

FIG. 6 shows an incoming picture message on a mobile device 610 owned by a user, according to an exemplary embodiment of the present invention. In this embodiment, mobile device 610 is shown having a touchscreen 611. However, other types of devices can be used, including those with keyboards/keypads for input. In either case, display 611 shows a New Picture Message received at mobile device 610. The image in the New Picture Message is that of a skateboard. The user has an option to save or erase the picture message. Other standard options may be known and are not shown. The user also has the ability to Refresh the image. This may be useful in cases where the user is unable to categorize the image, or when an image is set to expire after a fixed period. The image may contain optional text identifying the category to assist the user if a large number of images are to be used. Invalidating the image after a fixed period offers additional security for more sensitive applications such as banking, security, etc. Refreshing the image commands the system to request, generate, and transmit a new randomly selected image.

Figure 7:
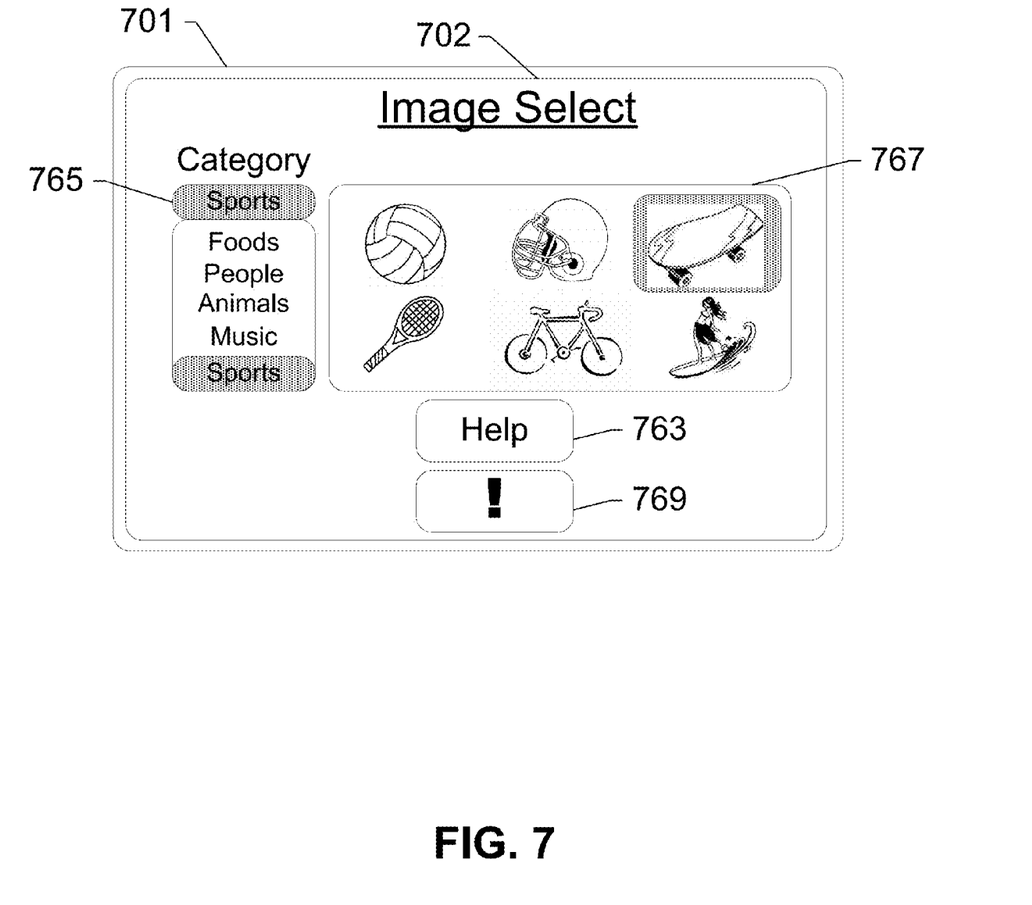
FIG. 7 shows an image selection screen on a user interface, according to an exemplary embodiment of the present invention.

FIG. 7 shows an image selection screen on an interface, according to an exemplary embodiment of the present invention. At the same time that the user of a mobile device receives the picture message, the interface displayed on screen 702 of terminal 701 moves on to an image selection screen. The user has an option of selecting a category from drop down list 765. The user selects the "sports" category, and is presented with a list of images related to sports in window 767. The user has to match the received MMS image with one of the displayed images. In this case, the user selects the skateboard in window 767, identical to the skateboard received in the MMS message.

Figure 8:
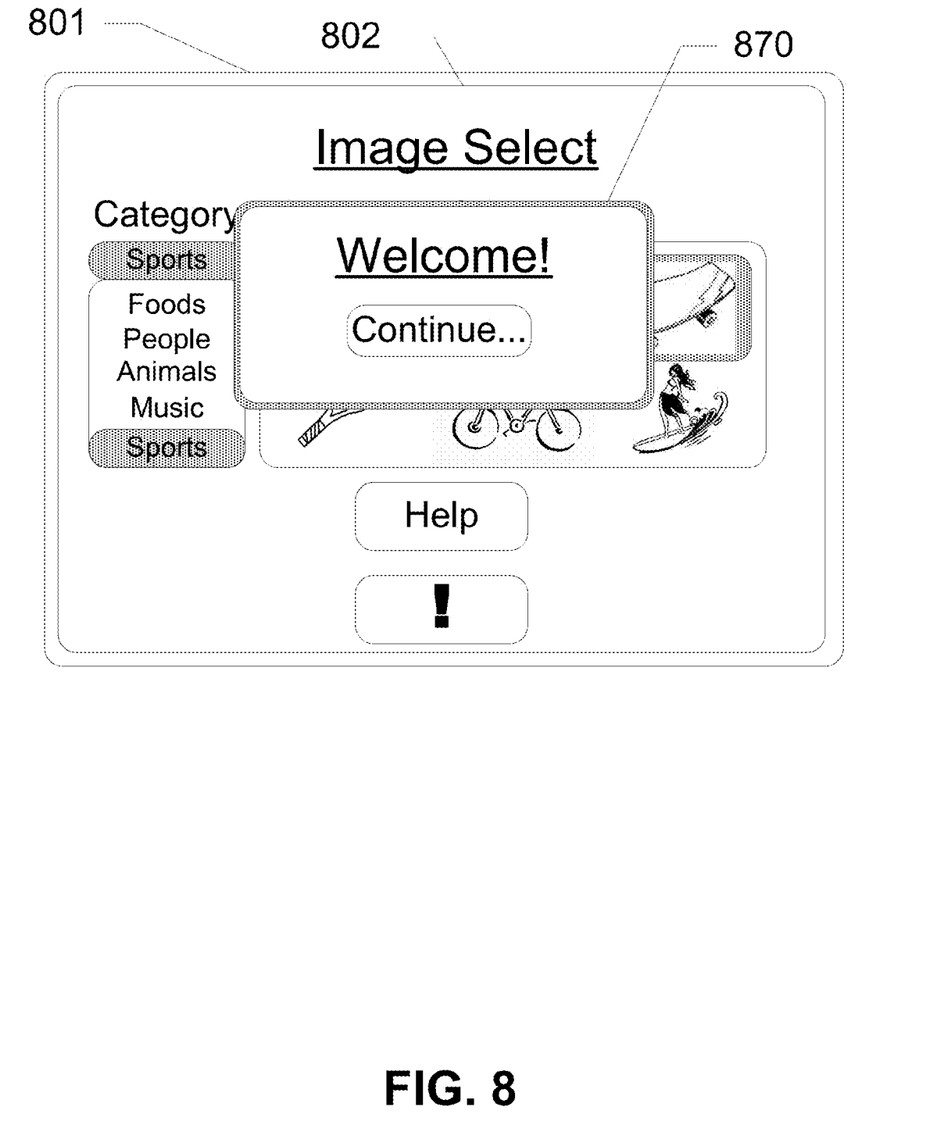
FIG. 8 shows the result of a successful authentication using image-matching, according to an exemplary embodiment of the present invention.

FIG. 8 shows the result of a successful authentication using image-matching, according to an exemplary embodiment of the present invention. The selection of the skateboard is verified at the host server as being the correct image transmitted from the authentication server. The host then welcomes the user in window 870 and offers the user to continue using the service.

Figure 9:
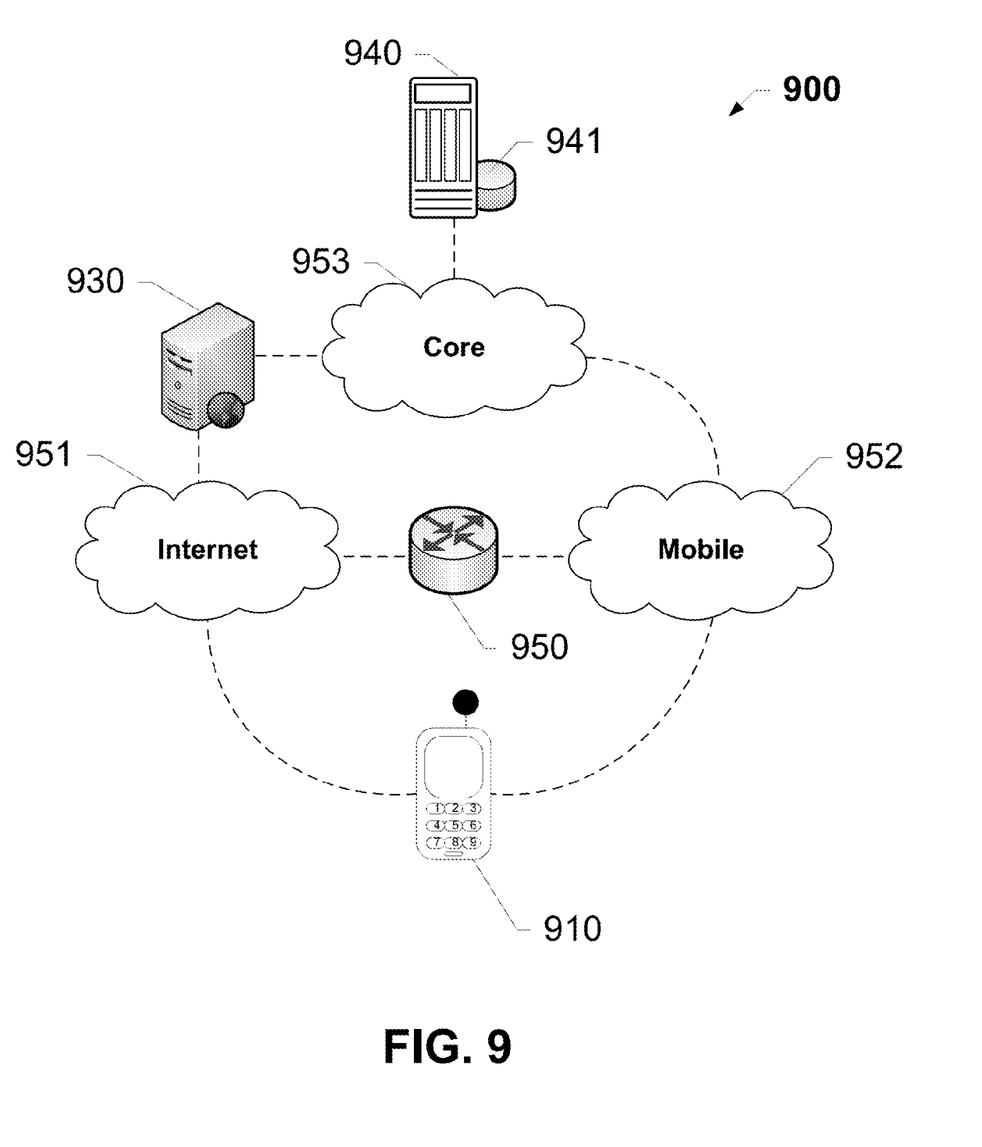
FIG. 9 shows a system for authenticating a user via a single mobile device, according to an exemplary embodiment of the present invention.
Figures 10A, 10B:
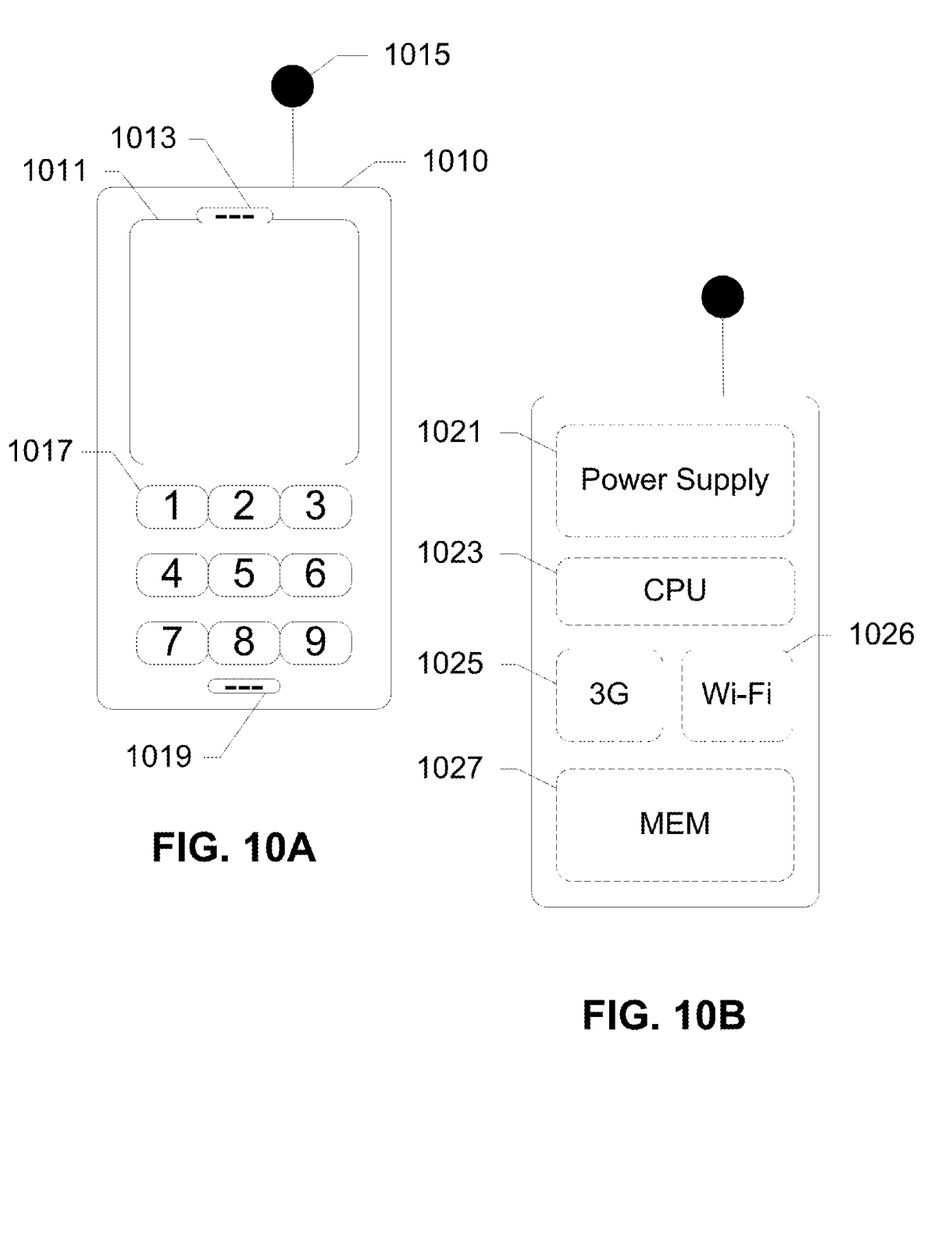
FIGS. 10A and 10B show the components of a mobile device, according to an exemplary embodiment of the present invention.

In alternate embodiments, a category is not needed, and a user simply receives an image and selects the image from a plurality of images displayed on the interface. In other embodiments, the image-matching process is one of a series of authentication mechanisms, including but not limited to a name and password combination, PIN code entry, biometric authentication (fingerprinting, eye-scanning, voice recognition), radio-frequency identification (RFID), and so on. In alternate embodiments, user interface 501/701/801 is a control panel on a security system, or any other system that places a physical barrier between the user and the service, such as a safety-deposit box, safe, restricted area, control room in an industrial process, etc. Further, alternate embodiments of the present invention enable the user to access the user interface via the same mobile device that he would receive the picture message on. FIGS. 9 and 10 show the features of this embodiment.

FIG. 9 shows a system for authenticating a user via a single mobile device, according to an exemplary embodiment of the present invention. System 900 is almost identical to system 200 shown in FIG. 2. Specifically, a user accesses host server 930 via a network such as the internet 951, and communicates with a mobile network 952. However, in this case both the Internet 951 and mobile network 952 are being accessed via the same device, i.e. mobile device 910. In other words, mobile device 910 is a dual mode device, having a plurality of transceivers that connect to different types of networks. This is elaborated upon further in FIG. 10. Briefly, mobile device 910 includes a 3G transceiver to communicate with mobile network 952, as well as a Wi-Fi or other type of transceiver that enables communication with the internet 951. Gateway 950 provides connectivity between networks 952 and 951, while a core network 953 provides access to entities at the back-end of mobile network 952, such as authentication server 940 having user database 941.

In operation, host 930 would have to provision a customer account in database 941, including a list of users that access the service(s) offered by host 930. A registered user access host 930 using mobile device 910, for instance, by pulling up an application on mobile device 910 that requires additional authentication, such as a mobile banking or mobile payment application. As described above, authentication server 940 constructs picture messages, for instance multimedia service (MMS) messages, and instructs mobile network 952 to transmit a randomly selected image to mobile device 910. Further, authentication server 940 transmits the image and/or related information to host 930. Host 930 displays a list of images via the interface, and user of mobile device 910 matches the MMS image with one of the list of images to gain access to a service.

FIGS. 10A and 10B respectively show the external and internal components of a mobile device, according to an exemplary embodiment of the present invention. Mobile device 1010 includes a display 1011, a speaker 1013, an antenna 1015, keyboard 1017, and speaker 1019. Mobile device 1010 further includes a power supply 1021, a central processing unit (CPU 1023), network interfaces or transceivers 1025 and 1026, and a memory 1027. Display 1011 is an LCD or LED or other type of display on which a user can view received picture messages, as well as other information such as a user interface. Display 1011 can also be a touchscreen, thereby being used as an input device. In embodiments not using a touchscreen, keypad 1017 is typically used as an input device, for instance, to type a phone number or a message. Keypad 1017 may be a numerical keypad, a QWERTY keyboard, etc. In embodiments where display 1011 is a touchscreen, keyboard 1017 can be a virtual keypad. Speaker 1013 provides an audio output for mobile device 1010. Microphone 1019 allows the user to verbally communicate with others using mobile device 1010. Antenna 1015 is a transducer designed to transmit or receive electromagnetic waves to and from a network.

In conjunction with antenna 1015, network interface 1025 allows mobile device 1010 to wirelessly communicate with a cellular network, or with other wireless devices across the cellular network. Network interface 1025 may be a cellular transceiver, wireless transceiver, etc., and includes combinations of transceivers to communicate with assorted wireless networks. Wi-Fi transceiver 1026 enables mobile device 1010 to wirelessly communicate over short ranges with a Wi-Fi access point, and through the access point, to a packet-based network such as the Internet, and servers, hosts, etc. on the internet. Power supply 1021 provides power to each of the components of mobile device 1010, and can include a battery, as well as an interface to an external power supply. CPU 1023 controls components of mobile device 1010 according to instructions in logic stored on memory 1027. Memory 1027 comprises any computer readable medium, such as RAM, ROM, etc. Memory 1027 stores logic for operating the components of mobile device 1010, as well as logic for receiving picture messages and optionally logic for accessing a user interface on a host. A user may input credentials on a user interface or website via another device such as a terminal, receive a picture message at mobile device 1010, and match the received picture message with one of a plurality of images displayed at the terminal. Alternatively, as described above, the user may access the user interface using Wi-Fi transceiver 1026 in conjunction with a terminal/browser application stored on memory 1027, and receive the picture message via network interface 1025 on the same device 1010. The user then matches the picture message with the images listed on the user interface displayed on screen 1011.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A memory storing instructions that, when executed by a server comprising a processor, cause the server to perform operations comprising:
   receiving a credential from a user via a user interface;
   in response to determining that the credential is valid, transmitting, to an authentication server, an authentication request;
   receiving, from the authentication server, information about a randomly selected image transmitted to a mobile device associated with the user;
   determining, based on the information about the randomly selected image, whether the randomly selected image is associated with a category;
   in response to determining that the randomly selected image is associated with a category, providing a plurality of categories for display on the user interface, the plurality of categories including the category associated with the randomly selected image;
   receiving, from the user, a selection of the category associated with the randomly selected image;
   in response to receiving the selection of the category associated with the randomly selected image, providing a plurality of images associated with the category for display on the user interface, the plurality of images including the randomly selected image;
   receiving, from the user, a selection of an image from the plurality of images;
   determining that the image matches the randomly selected image; and
   granting, to the user, access to the service.

2. The memory of claim 1, wherein the credential comprises an identifier of the user.

3. The memory of claim 2, wherein the authentication request comprises a request for a randomly selected image and the identifier of the user.

4. The memory of claim 1, wherein the plurality of images is stored on a central database and available to other users.

5. The memory of claim 1, wherein the randomly selected image is one of several images added to an account associated with the user during a provisioning process.

6. The memory of claim 1, wherein the credential comprises a name and password associated with the user.

7. The memory of claim 1, wherein receiving the information about the randomly selected image comprises receiving a copy of the randomly selected image.

8. The memory of claim 1, wherein text associated with the randomly selected image is transmitted to the mobile device associated with the user in response to a determination that the mobile device is incapable of receiving images.

9. A method for authenticating a user of a service offered by a service provider, the method comprising:
   receiving, at a server, a credential from the user via a user interface;
   transmitting, by the server to an authentication server, an authentication request;
   receiving, at the server from the authentication server, information about a randomly selected image transmitted to a mobile device associated with the user;
   determining, by the server based on the information about the randomly selected image, whether the randomly selected image is associated with a category;
   in response to determining that the randomly selected image is associated with a category, providing, by the server for display on the user interface, a plurality of categories, the plurality of categories including the category associated with the randomly selected image;
   receiving, at the server from the user, a selection of the category associated with the randomly selected image;
   in response to receiving the selection of the category associated with the randomly selected image, providing, by the server for display on the user interface, a plurality of images associated with the category, the plurality of images including the randomly selected image;
   receiving, by the server from the user, a selection of an image from the plurality of images;
   determining, by the server, that the image matches the randomly selected image; and
   granting, by the server to the user, access to the service.

10. The method of claim 9, wherein the credential comprises an identifier of the user.

11. The method of claim 10, wherein the authentication request comprises a request for a randomly selected image and the identifier of the user.

12. The method of claim 9, wherein the plurality of images is stored on a central database and available to other users.

13. A system for authenticating a user of a service offered by a service provider, the system comprising:
   a processor; and
   a memory storing instructions that, when executed by the processor, cause the processor to perform operations comprising
   receiving a credential from the user via a user interface;
   in response to determining that the credential is valid, transmitting, to an authentication server an authentication request;
   receiving, from the authentication server, information about a randomly selected image transmitted to a mobile device associated with the user;
   determining, based on the information about the randomly selected image, whether the randomly selected image is associated with a category;
   in response to determining that the randomly selected image is associated with a category, providing a plurality of categories for display on the user interface, the plurality of categories including the category associated with the randomly selected image;
   receiving, from the user, a selection of the category associated with the randomly selected image;
   in response to receiving the selection of the category associated with the randomly selected image, providing a plurality of images associated with the category for display on the user interface, the plurality of images including the randomly selected image;
   receiving, from the user, a selection of an image from the plurality of images;
   determining that the image matches the randomly selected image; and
   granting, to the user, access to the service.

14. The system of claim 13, further comprising a terminal to access the user interface, the terminal including at least a display and an input.

15. The system of claim 14, wherein the terminal is a computer that can access the user interface via a first network.

16. The system of claim 14, wherein the terminal is a logic unit on the mobile device.

17. The system of claim 13, wherein the credential comprises an identifier of the user.

18. The system of claim 17, wherein the authentication request comprises a request for a randomly selected image and the identifier of the user.

19. The system of claim 13, wherein the plurality of images is stored on a central database and available to other users.

20. The system of claim 13, wherein text associated with the randomly selected image is transmitted to the mobile device associated with the user in response to a determination that the mobile device is incapable of receiving images.

* * * * *